US007234393B2

(12) United States Patent
Lindsey et al.

(10) Patent No.: US 7,234,393 B2
(45) Date of Patent: Jun. 26, 2007

(54) INDUSTRIAL NUTCRACKER

(75) Inventors: Robert Eugene Lindsey, Salem, OR (US); Glenn Fredrick Monnier, Woodburn, OR (US)

(73) Assignee: Lindsey Family Farm, LLC, Salem, OR (US)

( * ) Notice: Subject to any disclaimer, the term of this patent is extended or adjusted under 35 U.S.C. 154(b) by 44 days.

(21) Appl. No.: 10/999,721

(22) Filed: Nov. 30, 2004

(65) Prior Publication Data

US 2006/0112839 A1    Jun. 1, 2006

(51) Int. Cl.
*A47J 43/00* (2006.01)
*A23N 6/00* (2006.01)
*B02B 5/00* (2006.01)
*B02C 7/18* (2006.01)

(52) U.S. Cl. .............. 99/571; 99/574; 99/580; 241/7; 241/275

(58) Field of Classification Search .......... 99/571, 99/580, 574, 609, 519; 241/275, 6, 7; 164/98
See application file for complete search history.

(56) References Cited

U.S. PATENT DOCUMENTS

| | | | | |
|---|---|---|---|---|
| 1,427,457 A | * | 8/1922 | Gillespie | ............. 99/571 |
| 1,484,563 A | * | 2/1924 | Riddle | ............. 99/571 |
| 4,126,280 A | * | 11/1978 | Burk | ............. 241/275 |
| 4,189,503 A | | 2/1980 | Giguere | |
| 4,393,762 A | * | 7/1983 | Jacobs | ............. 99/609 |
| 4,690,048 A | | 9/1987 | Namdari | |
| 5,076,158 A | | 12/1991 | Tippett | |
| 5,427,018 A | | 6/1995 | Liebing | |
| 5,697,292 A | * | 12/1997 | Simmons | ............. 99/574 |
| 5,711,213 A | | 1/1998 | Thomson | |
| 6,098,530 A | | 8/2000 | Hemry | |

* cited by examiner

*Primary Examiner*—Reginald L. Alexander
(74) *Attorney, Agent, or Firm*—Gavrilovich, Dodd & Lindsey, LLP

(57) ABSTRACT

An improved nutcracker and shelling process use centrifugal force to accelerate nuts so that their shells shatter upon impacting a target surface. The nutcracker includes an impeller having an intake for receiving nuts and an outlet for discharging the nuts. During operation, the impeller is spun so that the nuts received at the intake are accelerated as they pass through the impeller. The nuts reach a sufficiently fast speed so that their shells fracture upon hitting the target surface after being thrown from the impeller.

22 Claims, 4 Drawing Sheets

INDUSTRIAL NUTCRACKER

TECHNICAL FIELD

The invention relates generally to nutcrackers, and more specifically, to industrial nutcracking machines for shelling large quantities of nuts in commercial production environments.

BACKGROUND

In known commercial shelling processes, cracking tree nuts, e.g., hazelnuts, almonds, pecans, and the like, is accomplished by compressing the nut shells using a measured force. In these conventional processes, the nuts are passed between two hard surfaces (usually metal rollers) that are a fixed distance apart. This passage of the nuts compresses the nut shells until they crack.

However, the use of compression does not yield consistently good results. Damage to the nut kernels can run as high as 30% of the shelled product. This damage reduces considerably the value of the shelled kernel. Thus, it is important to minimize damage to nut kernels during the shelling process.

Most of this damage is caused by improper sizing of the nuts prior to passing them between the compression surfaces. That is, nuts that are too large are passed between rollers that are too close together. This not only cracks the shells, but also crushes the kernels. To add to the difficulty of properly sizing nuts, most tree nuts are not perfectly round. Instead, they are usually oblong shaped. Thus, the measured diameter of a nut obtained during the sizing process may be different than the diameter that is actually compressed during shelling. This can cause kernel damage, or alternatively, can result is a nut that passes through the cracker without getting shelled. Neither of these outcomes is desirable.

In addition to sizing, compression also requires that the nuts be cleaned and dried prior to shelling. This adds considerable cost to the overall shelling process. Indeed, drying a nutshell (which retains much of the moisture in a whole nut) and then discarding it to produce a shelled kernel represents a considerable waste of energy. It is important that these added costs of cleaning and drying are minimized or eliminated in a commercial shelling process.

In view of the foregoing problems and inefficiencies with conventional shelling processes, there is a need for an improved industrial nutcracker and shelling process for use in high-volume, commercial production environments.

SUMMARY

The present invention provides an improved shelling process and nutcracker that reduces damage to nut kernels and simplifies the overall nutcracking process by not requiring the steps of drying and sizing the nuts prior to cracking. In contrast to known industrial nutcrackers that compress nuts between rollers to crack their shells, the inventive nutcracker uses centrifugal force to accelerate the nuts so that their shells shatter upon impacting a target surface. This aspect of the nutcracker provides enormous advantage over conventional industrial nutcrackers because it does not rely on the width of the nut to generate the cracking force. This innovative approach to commercial shelling dramatically increases the quality of shelled kernels, while dramatically improving the efficiency of the shelling process.

In accordance with an exemplary embodiment of the present invention, a nutcracker includes an impeller having an intake for receiving nuts and an outlet for discharging the nuts. An impact surface is located near the outlet of the impeller. During operation, the impeller is spun so that the nuts received at the intake are accelerated as they pass through the impeller. The nuts reach a sufficiently fast speed so that when they are ejected from the outlet, their shells fracture upon hitting the impact surface.

Other systems, processes, features, embodiments and advantages of the invention will be or will become apparent to one with skill in the art upon examination of the following figures and detailed description. It is intended that all such additional systems, processes, features, embodiments and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
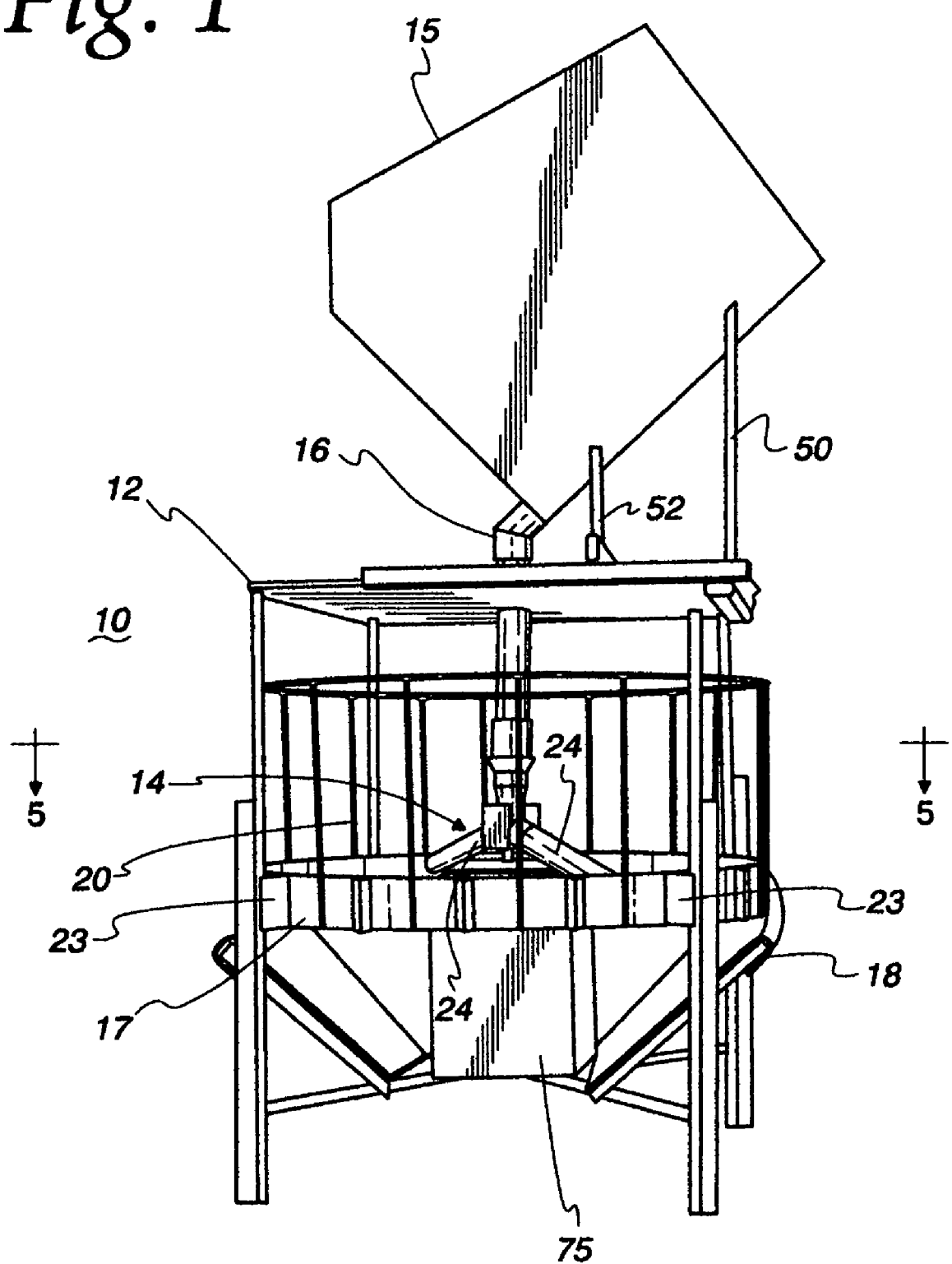
FIG. 1 is a perspective view of an industrial nutcracker in accordance with an examplary embodiment of the invention.

Turning now to the drawings, and in particular to FIG. 1, there is shown a perspective view of an industrial nutcracker 10 in accordance with an exemplary embodiment of the invention. The nutcracker 10 includes a support frame 12 supporting an overhead hopper 15 for holding bulk quantities of unshelled nuts. The nuts are tree nuts, preferably hazelnuts (filberts). Other types of nuts could be processed with the nutcracker 10.

The overhead hopper 15 is a generally rectangular-shaped top-open box that is loaded with nuts by a conveyer or forklift dump.

A vertical outlet chute 16 gravity-feeds the unshelled nuts from the hopper 15 into the center of an impeller 14. The chute 16 can be of any suitable dimensions, and is preferably 8" in diameter and approximately 30" in length.

The impeller 14 rotates to impart centrifugal force on the incoming nuts so that they are accelerated to a speed sufficient to crack their shells when they hit a solid surface.

The rotational axis of the impeller 14 is generally centered along the center axis of the chute 16. The impeller 14 includes a pair of opposed impeller tubes 24. Each of the impeller tubes 24 has an intake end 22 for receiving the nuts from the chute 16 and an outlet end 27 (see FIG. 2) for discharging the nuts. Each of the tubes 24 acts as a passage for the nuts to travel through. Although they can be of any suitable cross-sectional shape, size and length, each of the tubes 24 is preferably cylindrical with a five inch diameter and a 36" length.

The tubes 24 are angled downward at ten degrees relative to horizontal. This downward angling allows gravity to help facilitate passage of the nuts through the tubes 24. In some circumstances, the tubes 24 are positioned at other angles, including horizontal.

When the 14 impeller is spun, the nuts received at the intake 22 are accelerated by centrifugal force while passing through the impeller 14. The rotational speed of the impeller 14 is set at a speed sufficient to accelerate the nuts so that their shells fracture upon exiting the outlet ends 27 and hitting the impact surface of an impactor ring 17.

For hazelnuts, the rotational speed of the impeller 14 is preferably about 130 rpm, +/−10 rpm. A single speed impeller or variable speed impeller can be used. However, a variable speed impeller is preferred. The variable speed impeller is an advantageous feature of the nutcracker 10 that permits the shell-out performance of the nutcracker 10 to be adjusted depending on operational characteristics, which can vary due to any number of conditions. With a variable speed impeller, the rotational speed of the impeller 14 can be set to any suitable speed for shelling the particular nuts, which may depend on the characteristics of the nuts being cracked, such as the type of nuts, average debris content, their moisture content, etc. The rotational speed may also depend on environmental characteristics, such as temperature, humidity and the like.

A motor 74 (see FIG. 2), such as a commercially available hydraulic drive or electric motor, is used to spin the impeller 14. The motor 74 is preferably a variable speed motor 74 that can be controlled by an operator.

The impactor ring 17 is a cylinder of ¼" steel centered about the rotational axis of the impeller 14 and secured to the support frame 12. The impactor ring 17 is approximately 8" in height and six feet in diameter. The ring's 17 inner circumferential surface provides the impact surface for the nuts ejected from the impeller 14, and it is located about 4" from the outlet ends 27 of the impeller tubes 24. The impactor ring 17 can have other dimensions and can be placed at other locations relative to the impeller 14 or made of different materials and yet still remain within the scope of the present invention.

After hitting the impactor ring 17, the shelled nuts and any other output of the impeller 14 falls into a catch basin 18 located generally below the ring 17 and impeller 14. The basin 18 has four sides and an inverted-pyramid shape with an open bottom 51 (see FIG. 2). The output of the impeller 14, e.g., the nut shells, kernels and any unshelled nuts, fall through the open bottom 51 and are carried away by a conveyer 42 for further processing, including separation and sorting of the shells, kernels, and unshelled nuts.

The conveyer 42 can be a commercially available conveyer belt, shaker table or other suitable device for removing the output of the nutcracker 10.

Extending upwardly from the impactor ring 17 is a metal curtain support frame 20. The curtain support frame 17 allows a safety barrier to be erected around the impeller 14 and impactor ring 17 so that material ejected from the impeller 14 remains inside the nutcracker 10 during operation.

Figure 2:
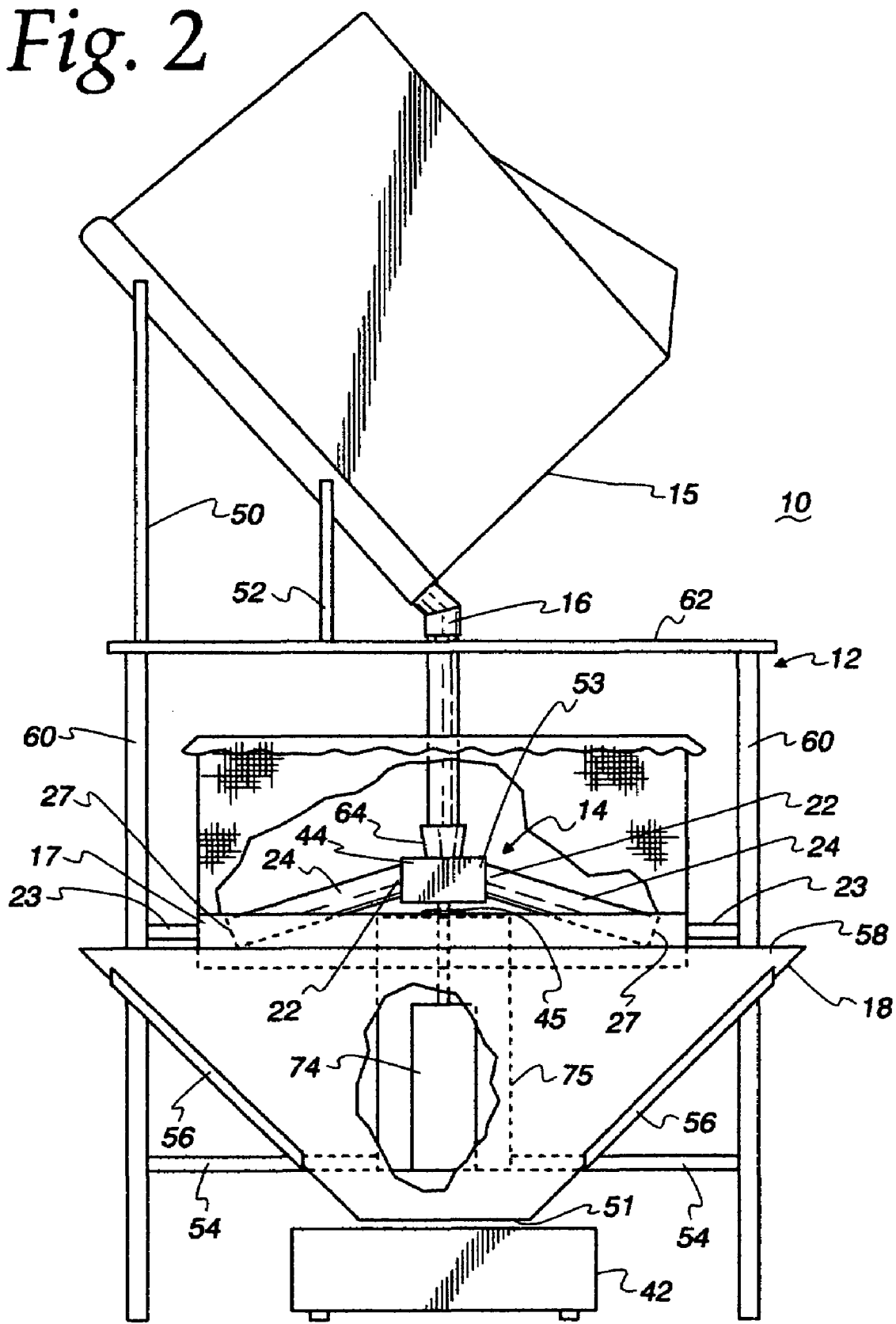
FIG. 2 is a partial cut-away side view of the nutcracker shown in FIG. 1.

FIG. 2 is a partial cut-away side view of the exemplary nutcracker 10 of FIG. 1 showing further details. The support frame 12 supports the entire structure of the nutcracker 10, and the frame 12 includes four corner support legs 60, four upper cross members 62, four lower cross members 54, four impactor ring support struts 23, hopper posts 50,52 and four basin wall supports 56. The elements of the support frame 12 are preferably steel beams of suitable strength and dimensions that are welded together. Other fastening means, such as bolts, can be used.

The posts 50,52 secure the overhead hopper 15 in place. The hopper wall can be made of any suitable material, such as plywood, sheet metal or the like.

The chute 16 can be made of any suitable material, such as commercially available PVC pipe or metal.

The basin wall supports 56 are preferably made of angle iron, and the basin walls 58 can be made of any suitable material, such as plywood, sheet metal or the like. As shown in the figure, the upper portion of the basin walls 58 extends out beyond the posts 60.

A curtain 40 is draped around the outside of the impeller 14 and impactor ring 17, and extends down into the basin 18. The curtain 40 prevents nutshells, kernels, etc. from flying outside the confines of the nutcracker 10 during operation. The curtain 40 can be made of any suitable material, such as canvas, heavy-duty plastic sheeting or the like. It is attached to the curtain support 20 (FIGS. 1, 3 and 4) using a suitable means, such as plastic ties.

The impeller 14 includes an impeller cradle 44 holding the two impeller tubes 24 and a lower intake chute 64. A shaft 46 attaches the motor 74 to the center of the impeller cradle 44. The motor 74 spins the shaft 46, which causes the impeller 14 to spin. The motor 74 can be a single speed motor, but is preferably a variable speed motor. Suitable variable speed electric or hydraulic motors and speed controllers are well known in the art. The motor 74 can optionally include a feedback controller for maintaining a constant rotational speed under varying load conditions.

The shaft 46 passes though a bearing 45 mounted to a motor housing 75. The motor housing 75 is a metal box that is welded to a support frame 80 (see FIG. 5). The motor housing support frame 80 is welded to the lower cross members 54. This structure supports the impeller 14 while spinning during operation. The impeller 14 is substantially balanced (i.e., it's center of mass is at or very near it's rotational axis) and has a weight sufficiently great so that when nuts and other material pass through it during normal operation, its rotational speed is not adversely reduced and it does not create excessive vibration.

The motor 74 is secured to the lower cross members 54.

The impeller 14 also includes the intake chute 64 which flares out around the outside of the lower end of the chute 16. In the embodiment shown, the intake chute 64 has a larger diameter than the outlet chute 16 and does not bear against the outlet chute 16.

Figure 3:
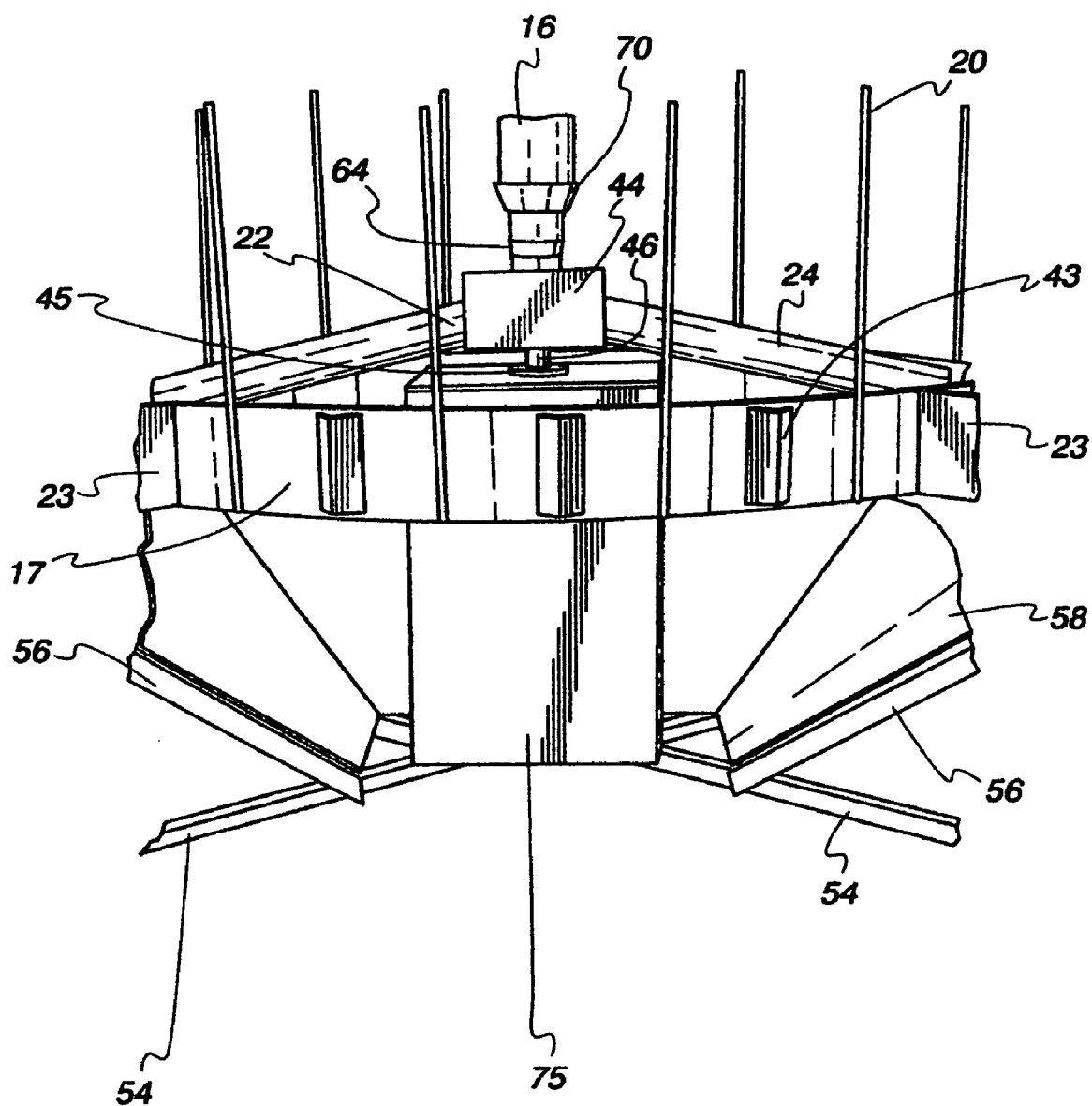
FIG. 3 is a cut-away partial front view of the nutcracker shown in FIG. 1.

FIG. 3 is a cut-away partial front view of the nutcracker 10, showing close-up details of the nutcracking mechanism itself.

Figure 4:
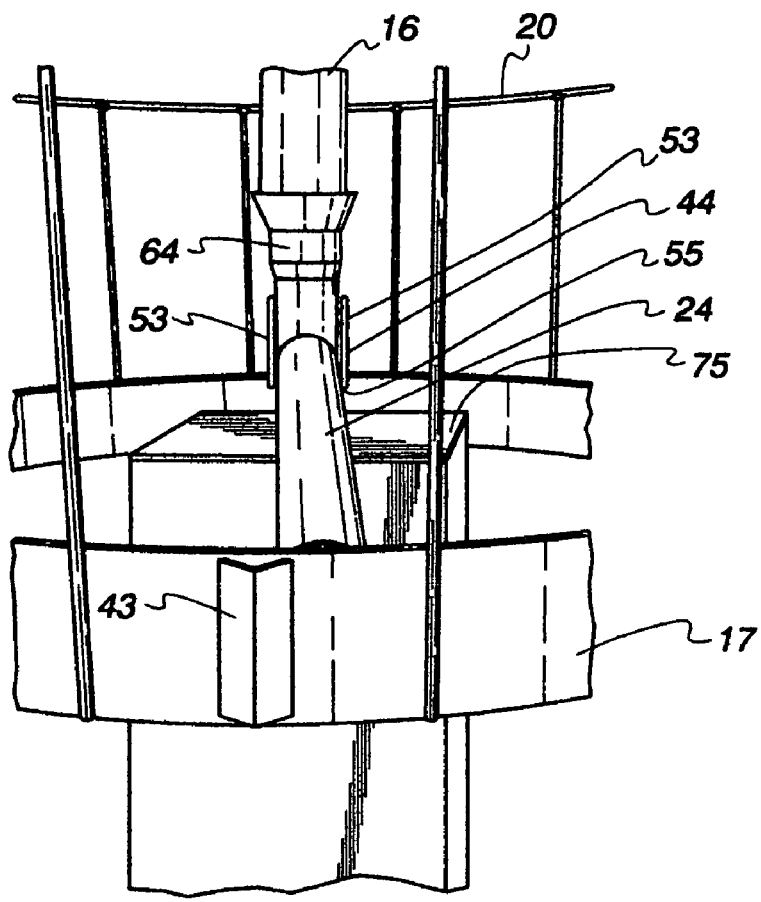
FIG. 4 is a perspective side view of the nutcracker shown in FIG. 1, showing details of the impeller cradle.

FIG. 4 is a perspective side view of the nutcracker shown in FIG. 1, showing details of the impeller cradle 44. The impeller cradle 44 is a metal three-sided, u-shaped cradle having substantial parallel upper sides 53 and a bottom side 55, which is fastened to the shaft 46. The tubes 24 and intake chute 64 are joined near the middle of the impeller cradle 44, and they are rigidly fastened to the cradle 44. The tubes 24 and chute 64 can be made of any suitable material, and are preferably made from sheet metal.

FIGS. 3–4 also show ribs 43 that are included along the outside circumference of the impactor ring 17 to add rigidity to the ring 17. The ribs 43 are pieces of 90° angle iron having a length approximately equal to the height of the impactor ring 17. The ribs 43 are welded to the exterior side of the ring 17 with approximately equal spacing between them.

Figure 5:
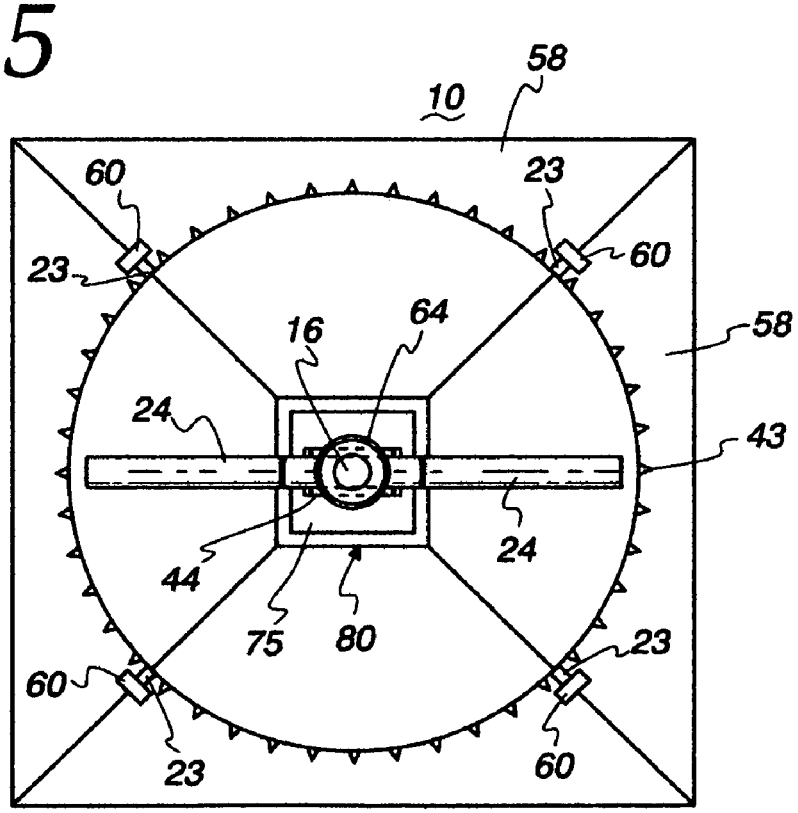
FIG. 5 is a cross-sectional top-down view of the nutcracker shown in FIG. 1.

FIG. 5 is a cross-sectional top-down view of the nutcracker 10 shown in FIG. 1. The motor housing support frame 80 is a rectangle made of steel beams sized to securely attach the motor housing 75 thereto.

Certain features of the nutcracker 10 can assume different structures than those specifically described above, and yet allow the nutcracker to function in a manner substantially similar to the embodiment described above in connection with FIGS. 1–5. For instance, the impeller may have different structures. In some circumstances, the impeller can include only a single impeller tube, instead of the two shown in FIGS. 1–5. In this structure, the single tube can be counter balanced to reduce vibration and premature wear of the rotating means. Alternatively, other impeller structures can include more than two tubes, with or without counter balancing, as well as have passages that are not cylindrical tubes, but are of some alternative shape and/or structure.

As a further alternative structure, the impeller can be a flat disk or a cone centered on the rotation means and having radial channels formed thereon by walls or other equivalent structures. The incoming, unshelled nuts are introduced into the centers of such spinning structures and accelerated by centrifugal force through the channels and ultimately cracked as described above.

In addition, impact surfaces other than the impactor ring 17 can be used. For example, in one alternative structure, an impact surface, such as a steel plate, can be fastened to the tubes 24 near each outlet end 27, substantially perpendicular to the axes of the tubes 24. The impact surfaces essentially become part of the impeller 14, and rotate with the tubes 24. The impact surfaces can be positioned so that after the accelerated nuts strike the surfaces, they are discharged through openings that remain at or near the outlet ends.

While an example embodiment of the invention has been described, it will be apparent to those of ordinary skill in the art that many more embodiments and implementations are possible that are within the scope of this invention. Further, the foregoing detailed description and drawings are considered as illustrative only of the principles of the invention. Since other modifications and changes may be or become apparent to those skilled in the art, the invention is not limited the exact construction and operation shown and described, and accordingly, all suitable modifications and equivalents are deemed to fall within the scope of the invention.

What is claimed is:

1. A nutcracker, comprising:
   an impeller adapted to be rotated about a vertical central axis, comprising
      a central intake, substantially centered on the vertical central axis, for feeding nuts into a center portion of the impeller, and
      a plurality of opposed hollow, cylindrical impeller tubes radially extending outwardly from the center portion of the impeller to respective terminal discharge openings, wherein the impeller tubes are angled downwardly from the center portion at a predetermined angle relative to the vertical central axis;
   a vertical drive shaft extending upwardly beneath the impeller along the vertical central axis and terminating at the underside of the impeller;
   a motor for rotating the vertical drive shaft to spin the impeller so that the nuts received at the central intake of the impeller are accelerated within the impeller tubes; and
   an impact ring surrounding the impeller and positioned so that nuts ejected from the discharge openings of the impeller tubes hit the impact ring.

2. The nutcracker of claim 1, wherein the predetermined angle is about 10 degrees below horizontal.

3. The nutcracker of claim 1, wherein each of the impeller tubes is about 5 inches in diameter and about 36 inches in length.

4. The nutcracker of claim 1, wherein the motor spins the impeller at about 130 revolutions per minute.

5. The nutcracker of claim 1, further comprising:
   a vertical chute, aligned along the vertical central axis above the impeller, for feeding the nuts into the central intake of the impeller.

6. The nutcracker of claim 1, further comprising:
   a basin, located generally below the impeller and impact ring, the basin adapted to catch the output of the impeller and direct the output to an opening in the bottom of the basin; and
   a conveyer belt, located below the bottom opening of the basin, for carrying the impeller output away.

7. The nutcracker of claim 1, wherein the motor is a variable speed motor.

8. The nutcracker of claim 1, further comprising an overhead hopper for holding unshelled nuts.

9. A nutcracker, comprising:
   a frame;
   an overhead hopper supported by the frame, for holding unshelled nuts;
   a vertical chute extending downwardly from the overhead hopper and substantially centered along a vertical central axis, for feeding the unshelled nuts from the overhead hopper;
   an impeller adapted to be rotated about the vertical central axis, comprising
      a central intake, substantially centered on the vertical central axis, for receiving the unshelled nuts from the vertical chute into a center portion of the impeller, and
      a plurality of opposed impeller tubes radially extending outwardly from the center portion of the impeller to respective terminal discharge openings;
   an impact ring surrounding the impeller such that nuts ejected from the discharge openings of the impeller tubes hit the impact ring;
   a basin, located generally below the impeller and impact ring and supported by the frame, the basin adapted to catch the output of the impeller and direct the output to an opening in the bottom of the basin;
   a housing, located within the basin and supported by the frame, forming an enclosure beneath the impeller;
   a vertical drive shaft extending upwardly from the housing along the vertical central axis and terminating at the underside of the impeller, the vertical drive shaft cooperating with the housing to support the impeller; and
   a motor enclosed within the housing, for rotating the vertical drive shaft to spin the impeller so that the unshelled nuts are accelerated within the impeller tubes.

10. The nutcracker of claim 9, wherein the impeller tubes are angled downwardly from the center portion at a predetermined angle relative to the vertical central axis.

11. The nutcracker of claim 10, wherein the predetermined angle is about 10 degrees below horizontal.

12. The nutcracker of claim 9, wherein each of the impeller tubes is a hollow cylinder.

13. The nutcracker of claim 12, wherein each of the impeller tubes is about 5 inches in diameter and about 36 inches in length.

14. The nutcracker of claim 9, wherein the motor spins the impeller at about 130 revolutions per minute.

15. The nutcracker of claim 9, further comprising:
a conveyer belt, located below the bottom opening of the basin, for carrying the impeller output away.

16. The nutcracker of claim 9, wherein the motor is a variable speed motor.

17. The nutcracker of claim 9, further comprising a bearing, mounted to the housing, wherein the vertical drive shaft extends through the bearing.

18. A process of cracking tree nuts, comprising:
providing a nutcracker having an impeller adapted to be rotated about a vertical central axis, the impeller having a central intake, substantially centered on the vertical central axis, for feeding the tree nuts into a center portion of the impeller;
providing a plurality of opposed hollow, cylindrical impeller tubes as part of the impeller, the impeller tubes radially extending outwardly from the center portion of the impeller to respective terminal discharge openings, each of the impeller tubes having a predetermined cross-section adapted to allow passage of a predetermined type of tree nut and a predetermined length adapted to accelerate the predetermined type of tree nut to a predetermined impact velocity at a predetermined rotational speed of the impeller;
providing a vertical drive shaft extending upwardly beneath the impeller along the vertical central axis and terminating at the underside of the impeller;
feeding the predetermined type of tree nuts into the impeller; and
rotating the vertical drive shaft, using a motor, to spin the impeller at about predetermined rotational speed so that the tree nuts received at the central intake are accelerated by the impeller tubes to about the predetermined impact velocity, wherein the predetermined impact velocity is sufficient to fracture the shells of the predetermined type of tree nuts upon exiting the discharge openings and hitting an impact surface.

19. The process of claim 18, further comprising:
adjusting the predetermined rotational speed based on the operational characteristics of the nutcracker.

20. The process of claim 18, further comprising:
placing the tree nuts into a hopper located above the impeller; and
feeding the tree nuts from the overhead hopper into the central intake of the impeller using a vertical chute that extends downwardly from the overhead hopper, substantially centered along the vertical central axis.

21. The process of claim 18, wherein the predetermined cross-section is about 5 inches in diameter and the predetermined length is about 36 inches.

22. The process of claim 18, wherein the predetermined rotational speed is about 130 revolutions per minute.

* * * * *